Patented Aug. 10, 1948

2,446,869

UNITED STATES PATENT OFFICE 2,446,869

METHOD OF PREPARING CALCIUM HYPOCHLORITE

George L. Cunningham, Painesville, Ohio, assignor to Diamond Alkali Company, Pittsburgh, Pa., a corporation of Delaware No Drawing. Application December 13, 1943, Serial No. 514,097

7 Claims. (Cl. 23—86)

The present invention relates generally to the art of preparing oxidizing bleaching agents, and more particularly to a new and improved method of preparing calcium hypochlorite.

Greater stability, decreased shipping expenses and increased ease in packaging and handling have combined to bring dry, high test calcium hypochlorite products into greater demand than the same products in solution, slurry, or wet cake form, and the development of economical methods of preparing calcium hypochlorite in dry form and of high purity has accordingly been stimulated. In accordance with one previously suggested method of commercial importance, dibasic calcium hypochlorite prepared by chlorinating an aqueous slurry containing calcium hydroxide and separating the crystallized basic compound from the liquid containing calcium chloride, is slurried with water and chlorinated to practical exhaustion of the calcium hydroxide. This procedure is not thoroughly satisfactory, however, because the resulting hypochlorite is contaminated to a considerable degree with calcium chloride formed during the final chlorination and further treatment is required to remove this undesirable hygroscopic substance from the hypochlorite product. By the so-called "Japanese Process," which has found extensive commercial use, dibasic calcium hypochlorite crystals are decomposed with water and the undissolved lime, which is removed from the resulting solution of calcium hypochlorite, is chlorinated in a repetition of the cycle to produce more dibasic calcium hypochlorite. This would probably qualify as a superior method of preparing calcium hypochlorite substantially free of calcium chloride, except for the fact that it is not thereby possible to produce aqueous calcium hypochlorite solutions of more than about 8% strength. To concentrate such dilute solutions and to recover therefrom a dry product, it is necessary to remove about 12.5 pounds of water per pound of calcium hypochlorite. In practice this removal is customarily accomplished through evaporation entailing heavy fuel consumption, rapid corrosion of evaporators, and excessive decomposition of the product.

By the process of my invention, on the other hand, it is easily possible to prepare in an efficient and economical manner, substantially calcium chloride-free, dry calcium hypochlorite from basic calcium hypochlorite without excessive evaporation and without a treatment of the hypochlorite product designed to eliminate therefrom calcium chloride.

This invention is predicated upon my discovery that carbon dioxide gas, which has hitherto been generally regarded as having a deleterious effect on calcium hypochlorite stability, does not, under certain conditions, so affect the stability of said hypochlorite, and that this gas in almost any concentration may in proper circumstances advantageously be employed in effecting separation and removal of calcium hydroxide from calcium hypochlorite in aqueous media containing in excess of 8% of said hypochlorite.

Briefly, the process of my invention comprises the steps of slurrying with water at a temperature of about 20° C., a basic calcium hypochlorite containing an amount of calcium hypochlorite equivalent to not more than about 22% by weight of said water, and contacting the resulting slurry with carbon dioxide-containing gas until the calcium hydroxide of said slurry is practically completely reacted and converted to calcium carbonate.

Preliminary to the operation of this process, it is, of course, necessary to prepare or otherwise obtain basic calcium hypochlorite. This substance can conveniently be synthesized either by controlled chlorination of an aqueous lime slurry or by the addition of lime to an aqueous solution of the hypochlorite and chloride of calcium. The precipitated product in crystalline form is in practice customarily separated from mother liquor by centrifuging the mixture, but such separation can also be accomplished satisfactorily through filtration and equivalent methods. Because the easiest and cleanest separation of crystallized basic product from liquor is possible with dibasic calcium hypochlorite

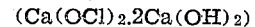

$$Ca(OCl)_2.2Ca(OH)_2$$

probably due to physical characteristics of the dibasic crystal, I prepare and use this compound in the process of my invention.

Tribasic calcium hypochlorite, which may be represented by the formula $Ca(OCl)_2.3Ca(OH)_2$, is alleged by some authorities to exist; but, so far as I know, there is conclusive proof only to the existence of the monobasic

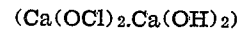

$$Ca(OCl)_2.Ca(OH)_2$$

and dibasic forms. In any event, however, I prefer the dibasic compound, though mixtures of mono and dibasic compounds may be employed. Other basic hypochlorites of calcium are operable and within the purview of my invention as defined herein and in the appended claims.

In the practice of this invention dibasic calcium hypochlorite is slurried with water and the quantities of water and dibasic compound are so adjusted that there is associated with the resulting slurry not more than about 22%, and preferably only about 18%, by weight based upon the water in said slurry of free and combined calcium hypochlorite. A greater concentration of calcium hypochlorite would result in loss thereof since its water solubility in the temperature range in which I prefer to operate is approximately 22% of the weight of aqueous solvent, and since solids are preferably separated and removed from the liquid phase containing calcium hypochlorite before the latter is dehydrated to obtain dry hypochlorite product. If desired, the basic compound may be added to the water in two parts, solids being removed between additions. For example, a concentration of about 6% of calcium hypochlorite may first be provided in a slurry of basic calcium hypochlorite, solids may be removed, and further addition of basic hypochlorite to provide an additional 12% of calcium hypochlorite may then be had.

It is desirable, because of the instability of calcium hypochlorite, to maintain the temperature of the slurry of basic compound at between about the ice-forming temperature and 30° C., and for reasons of economy and convenience, as well as hypochlorite stability, I prefer to keep the slurries at a temperature of about 20° C. When the calcium hypochlorite solutions obtained upon filtration of aforementioned slurries are evaporated and the hypochlorite product is dried, it is, of course, not ordinarily feasible, even under very high vacuum, to maintain the solution and product temperature below about 30° C. However, the period during which the hypochlorite is subjected to more elevated temperatures to accomplish dehydration thereof is preferably as abbreviated as possible.

The following expression in chemical symbols represents what I believe occurs when dibasic calcium hypochlorite is treated in accordance with my invention:

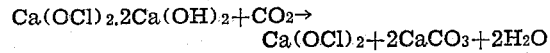

$$Ca(OCl)_2 \cdot 2Ca(OH)_2 + CO_2 \rightarrow Ca(OCl)_2 + 2CaCO_3 + 2H_2O$$

where $Ca(OCl)_2 \cdot 2Ca(OH)_2$ is the dibasic compound; $CO_2$ is carbon dioxide; $Ca(OCl)_2$ is calcium hypochlorite; $CaCO_3$ is calcium carbonate; and $H_2O$ is water.

Other basic hypochlorites presumably react in substantially the same manner to yield the same products in different ratios. Carbonation of the monobasic form would, for instance, lead to the formation of equimolar quantities of calcium hypochlorite and calcium carbonate, instead of the one to two molar ratio of these materials indicated in the above equation.

In carrying out this invention a quantity of basic calcium hypochlorite may advantageously be added to water to provide not more than about 18% to 20% of calcium hypochlorite in free or combined form with respect to the weight of said water, and the resulting aqueous mixture contacted with carbon dioxide-containing gas until all but less than about 5% of the lime of the mixture is reacted and converted to the carbonate. For the purpose pure, or dilute and impure, carbon dioxide gas may be employed, but I prefer the latter as it serves desirably as a more effective aqueous mixture agitation means. It is, of course, important that the impure carbon dioxide used shall not contain organic vapors and other acid gases such as hydrogen sulfide as these tend to destroy hypochlorite ions and thus reduce the value of the product.

Carbonation can theoretically be carried to the point of exhaustion of the calcium hydroxide of the dibasic hypochlorite without causing decomposition and loss of hypochlorite product through reaction thereof with dissolved carbonic gas. For two practical reasons, however, it is not desirable to carry carbonation to that extreme. In the first place, it is practically impossible in commercial operation to control the carbonation reaction as closely as would be necessary in order to determine exactly when to discontinue addition of carbonating gas to the aqueous mixture. Secondly, the problem of agitating the aqueous mixture sufficiently to prevent local over-carbonation and resulting decomposition of hypochlorite and formation of undesirable calcium chloride, is increased as the amount of basic hypochlorite present in the mixture decreases. Loss of about 5% of the basic hypochlorite introduced into the aqueous medium is not thought to entail expense comparable to that of a process involving these close controls and special attentions.

If the water of the resulting aqueous mixture is removed without causing appreciable decomposition of hypochlorite therein, a product will be obtained which contains a relatively small percentage by weight of hypochlorite. If, on the other hand, a separation of solid from the aqueous mixture is made before the latter is dehydrated, a product is recovered which contains a considerably greater percentage by weight of hypochlorite. I prefer, therefore, to make a solid-liquid separation preliminary to the dehydration operation, and this I prefer to do through a simple filtration, but can satisfactorily do by settling and decanting, centrifuging, or equivalent methods.

Evaporation of the aqueous hypochlorite and drying of the solid product may advantageously be accomplished by spray drying said aqueous substance in accordance with known practice. Alternatively, the aqueous material may be evaporated under vacuum at a relatively low temperature and the solid product dried on a conventional type vacuum shelf dryer. Other means and methods may be employed and success thereby realized if proper precautions are taken to prevent excessive hypochlorite decomposition.

The following examples of the process of my invention, as I have operated it, may serve further to explain the invention, but are not to be construed as imposing any limitations thereon:

Example I

One part of dibasic calcium hypochlorite filter cake obtained from a chlorinated lime slurry and having the following approximate composition:

|  | Per cent |
|---|---|
| Calcium hypochlorite | 34 |
| Calcium hydroxide | 35 |
| Calcium chloride | 8 |
| Moisture | 23 | was diluted with 5.4 times its weight of water. The resulting slurry, after being vigorously agitated for about 30 minutes, was filtered to effect removal therefrom of insoluble calcium hydroxide. To the filtrate was added two parts of dibasic filter cake and into the resulting slurry undergoing vigorous agitation was introduced a chlorine and chlorine compound-free gas containing 20% by weight of carbon dioxide. After all but less than about 5% of the calcium hydroxide was carbonated, the flow of carbonating gas was discontinued and the slurry was filtered to remove the solid calcium carbonate from the liquid phase. Throughout the foregoing operations, the temperature of the basic hypochlorite filter cake and the resulting hypochlorite composition was maintained at between 20° C. and 25° C. The filtrate was spray dried and the dry product contained about 70% available chlorine. Only about 4% of the hypochlorite was decomposed during carbonation and dehydration.

Example II

One part of monobasic calcium hyopchlorite filter cake obtained from a chlorinated lime slurry and having the following approximate composition:

| | Per cent |
|---|---|
| Calcium hypochlorite | 48 |
| Calcium hydroxide | 25 |
| Calcium chloride | 5 |
| Moisture | 22 | was diluted with 8.0 parts by weight of water. The resulting slurry, after being agitated vigorously for about 30 minutes, was filtered to effect removal therefrom of insoluble calcium hydroxide. To the filtrate was added two parts of monobasic filter cake and into the resulting slurry undergoing vigorous agitation was introduced chlorine compond-free gas containing 10% by weight of carbon dioxide. After all but less than about 5% of the calcium hydroxide was carbonated, the flow of carbonating gas was discontinued and the slurry was filtered. Throughout the foregoing operations, the temperature of the basic hypochlorite filter cake and the resulting hypochlorite composition was maintained at between 20° C. and 25° C. The clear filtrate was spray dried and the resulting dry product contained about 72% available chlorine.

Having thus described the present invention so that others skilled in the art may be able to understand and practice the same, I state that what I desire to secure by Letters Patent is defined in what is claimed.

What is claimed is:

1. The method of preparing calcium hypochlorite substantially free from calcium chloride, which comprises the steps of simultaneously carbonating and vigorously agitating an aqueous slurry of basic calcium hypochlorite until substantially all of said basic calcium hypochlorite is converted to normal calcium hypochlorite, and separately recovering said normal calcium hypochlorite.

2. The method of preparing calcium hypochlorite substantially free from calcium chloride, which comprises the steps of slurrying basic calcium hypochlorite with water at a temperature between about 0° C. and about 30° C., agitating said slurry and contacting it with carbon dioxide uncontaminated by calcium chloride producing substances to convert substantially all of said basic calcium hypochlorite to normal calcium hypochlorite, and separately recovering said normal calcium hypochlorite.

3. The method of preparing calcium hypochlorite substantially free from calcium chloride, which comprises the steps of slurrying monobasic calcium hypochlorite with water at a temperature between about 0° C. and about 30° C., agitating said slurry, contacting the resulting slurry with carbon dioxide uncontaminated by calcium chloride producing substances to convert substantially all of said basic calcium hypochlorite to normal calcium hypochlorite, and separately recovering said normal calcium hypochlorite.

4. The method of preparing calcium hypochlorite substantially free from calcium chloride, which comprises the steps of slurrying a mixture comprising monobasic and dibasic calcium hypochlorite with water at a temperature between about 0° C. and about 30° C., agitating said slurry, contacting said slurry with carbon dioxide uncontaminated by calcium chloride producing substances to convert substantially all of said basic calcium hypochlorite to normal calcium hypochlorite, and separately recovering said normal calcium hypochlorite.

5. The method of preparing calcium hypochlorite substantially free from calcium chloride, which comprises the steps of slurrying dibasic calcium hypochlorite with water to provide a concentration of available calcium hypochlorite of not over 22%, based upon the water of the slurry, agitating said slurry, contacting said slurry with carbon dioxide uncontaminated by calcium chloride producing substances to convert substantially all of said basic calcium hypochlorite to normal calcium hypochlorite, removing solids from said solution, and separately recovering said normal calcium hypochlorite.

6. The method of preparing high purity, dry calcium hypochlorite substantially free from calcium chloride, which comprises the steps of slurrying dibasic calcium hypochlorite with water to provide a concentration of available calcium hypochlorite of not over 22%, based upon the water of the slurry, at a temperature of about 20° C., agitating said slurry, contacting said slurry with carbon dioxide, to convert substantially all of said basic calcium hypochlorite to normal calcium hypochlorite, removing solids from said solution, separately recovering said normal calcium hypochlorite, and drying said calcium hypochlorite.

7. The method of preparing calcium hypochlorite substantially free from calcium chloride, which comprises the steps of slurrying dibasic calcium hypochlorite with water at a temperature of between about 0° C. and about 30° C., said dibasic calcium hypochlorite being provided in a concentration to provide an amount of calcium hypochlorite equivalent to about 6% by weight of said water, separating and removing the solid phase from the liquid containing calcium hypochlorite, slurrying dibasic calcium hypochlorite with said liquid at a temperature between about 0° C. and about 30° C., said dibasic calcium hypochlorite being provided in concentration to provide an additional amount of calcium hypochlorite equivalent to about 12% by weight of the liquid, contacting the resulting slurry with gaseous carbon dioxide uncontaminated by calcium chloride producing substances to convert substantially all of said basic calcium hypochlorite to normal calcium hypochlorite, removing solids from said solution, separately recovering said normal calcium hypochlorite, and drying said calcium hypochlorite.

GEORGE L. CUNNINGHAM.

REFERENCES CITED

The following references are of record in the file of this patent:

UNITED STATES PATENTS

| Number | Name | Date |
|---|---|---|
| 1,288,587 | Hoffman et al. | Dec. 24, 1918 |
| 2,061,332 | Rue | Nov. 17, 1936 |
| 2,288,841 | Ritter | July 7, 1942 |